Dec. 29, 1936.  G. MARLSDALE  2,065,717
LAWN SEED AND FERTILIZER DISTRIBUTOR
Filed Feb. 11, 1936
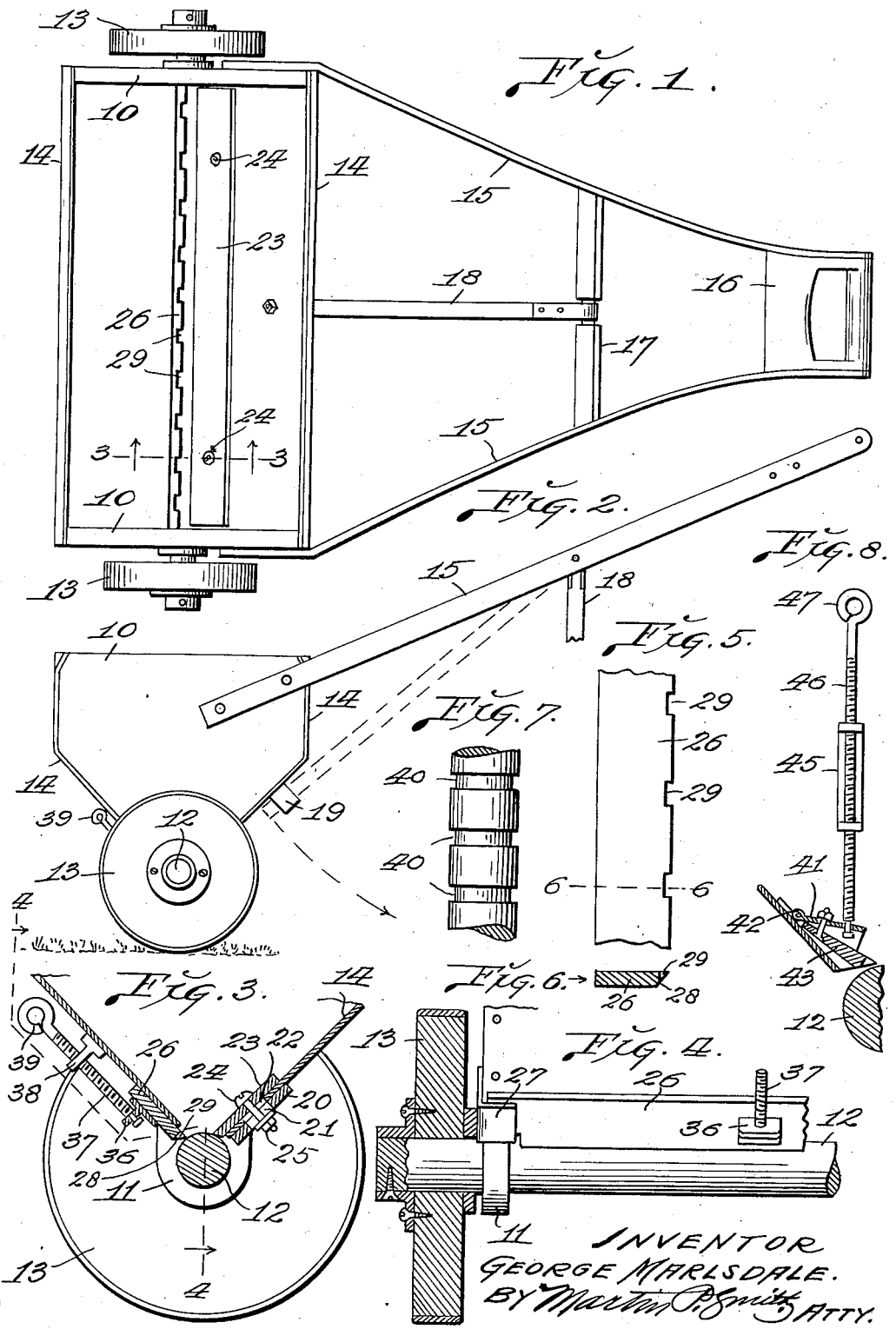
INVENTOR
GEORGE MARLSDALE.
BY Martin P. Smith ATTY.

Patented Dec. 29, 1936

2,065,717

UNITED STATES PATENT OFFICE 2,065,717

LAWN SEED AND FERTILIZER DISTRIBUTOR

George Marlsdale, Los Angeles, Calif.

Application February 11, 1936, Serial No. 63,445

2 Claims. (Cl 221—130)

My invention relates to a lawn seed and fertilizer distributor and has for its principal object, the provision of a relatively simple, practical and inexpensive implement that may be conveniently moved over lawns and the like for effecting a uniform distribution of lawn seed, fertilizer and the like over the surface of the ground and to provide simple and efficient means for accurately controlling the discharge of seed and fertilizer from the hopper forming a part of the implement.

Further objects of my invention are, to provide a distributor of the character referred to that will effect a very even distribution of the seed of fertilizer upon the ground over which the distributor is moved and further, to provide a construction that prevents leakage and waste of the seed and fertilizer when the distributor is at rest.

With the foregoing and other objects in view my invention consists in certain novel features of construction and arrangements of parts that will be hereinafter more fully described and claimed and illustrated in the accompanying drawing in which:

Fig. 1 is a top plan view of the distributor.

Fig. 2 is a side elevational view.

Fig. 3 is an enlarged vertical section taken on the line 3—3 of Fig. 1.

Fig. 4 is an elevational view partly in section and taken on the line 4—4 of Fig. 3.

Fig. 5 is an enlarged plan view of a portion of an adjustable gate or valve that controls the discharge of seed and fertilizer from the hopper.

Fig. 6 is a cross section taken on the line 6—6 of Fig. 5.

Fig. 7 is a plan view of a modified form of the axle of the distributor.

Fig. 8 is a vertical section showing a modified arrangement for adjusting the position of the discharge control valve or gate.

Referring by numerals to the accompanying drawing which illustrates a preferred embodiment of my invention, 10, 10 designate the end walls of a hopper, which walls are preferably formed of wood and the lower portions of these end walls gradually decrease in width toward their lower ends so as to form V-shaped lower portions and the lower ends of these portions are provided with bearings 11 for an axle 12.

Secured to the ends of this axle just outside the end walls 10, are wheels 13.

The side walls 14 of the hopper are preferably formed of sheet metal and the lower edges of these side walls terminate between the bearings 11 a short distance above the periphery of axle 12.

Secured to the upper outer portions of the end walls 10 are the lower ends of outwardly and upwardly projecting arms 15 that converge toward their outer ends and arranged between said outer ends, is a handle 16.

Arranged between and secured to the intermediate portions of the arms 15, is a cross bar 17, on which is mounted for rotation the upper end of a leg 18 which, when moved into a vertical position with its lower end resting on the ground, provides a support for the handle and maintains the hopper portion of the distributor in an upright position as illustrated in Fig. 2.

When the distributor is being moved over the ground, leg 17 is swung forwardly and upwardly and its lower portion is removably positioned in a spring clip 19 that is secured to the adjacent side wall 14 (see dotted lines Fig. 2).

Secured to the outer face of the rear one of the side walls 14, and lying parallel with the lower edge of said wall, is a strip 20, preferably of wood and formed therein, preferably adjacent its ends, are short slots 21 that are disposed transversely of the strip. Corresponding slots 22 are formed in the side wall beneath this strip 20.

Positioned on the inner face of the side wall directly above the strip 20, is a strip 23, preferably of wood, the lower edge of which is beveled so that it may rest directly on the periphery of the axle 12.

Passing through apertures in strip 23 and through the slots 20 and 22 are bolts such as 24, the threaded outer ends of which receive nuts 25.

As a result of this construction strip 23 may from time to time be moved downwardly to maintain rubbing contact with the periphery of the axle 12 so as to prevent leakage of seed and fertilizer between said strip and the axle and after being thus adjusted the strip may be secured in such position by tightening the nuts 25 on bolts 24.

Positioned against the outer face of the front one of the side walls 14, and overlying the lower edge thereof, is a strip 26, preferably of wood, that functions as a valve or gate to control the discharge of seed and fertilizer from the hopper and the ends of this strip are retained for sliding movement in L-shaped keepers 27 that are secured to the end walls 10 just above the bearings 11 and which overlie the ends of said strip.

The lower edge of strip 26 is beveled as designated by 28 and throughout its length this beveled edge is provided with spaced notches 29 through which the seed and fertilizer pass while the distributor is in operation.

Secured to the outer face of strip 26, adjacent its ends, are L-shaped brackets 36, in which are rotatably mounted the lower ends of threaded rods 37, the latter extending upwardly through threaded brackets 38 that are secured to the outer face of the front one of the walls 14.

The upper ends of the threaded rods 37 are provided with heads or loops 39, which may be conveniently engaged when the rods are rotated to move strip 26 toward or away from the axle.

In the use of my improved distributor, strip 23 is moved downward so that its beveled lower edge has rubbing contact with the axle 12 and said strip is secured in such position by tightening the nuts 25.

Strip 26 is moved toward or away from the periphery of the axle by manipulation of the screw rods 37 and such adjustment is necessary for different varieties of lawn seeds and for commercial fertilizer that is pulverized to different degrees of fineness.

The hopper is now filled or partially filled with lawn seed or pulverized fertilizer and the distributor is moved forwardly over the ground that is to be seeded or fertilized.

Inasmuch as axle 12 is secured to the wheels, said axle will be rotated so as to agitate the seed or fertilizer in the lower portion of the hopper and cause the same to discharge in thin small streams through the apertures 29 and after such discharge the seed or fertilizer drops onto the ground.

Owing to the short depth of the notches 29 the seed and fertilizer will not leak or flow through said notches when the distributor is at rest and thus loss and waste of that portion of the seed and fertilizer that remains in the hopper after use is eliminated.

In Figure 7 I have shown a modified construction wherein the wheel carrying axle is provided in its periphery with shallow spaced grooves 40 and where such construction is carried out it is not necessary to provide the notches 28 in the gate or valve 26.

In Fig. 8 I have illustrated a modified construction for adjusting the strip that controls the discharge of seed and fertilizer from the hopper. This adjusting means is located within the hopper and comprises small metal plates or housings 41 that are connected by hinges 42 to the inside of the front wall of the hopper a short distance from the lower edge thereof.

Rigidly secured to these plates or housings, is a strip 43, preferably of wood having a beveled lower edge that may be positioned directly upon or adjacent the periphery of the axle and formed in said beveled edge are notches 44 similar to the notches 29.

Mounted on the inner faces of the end walls 10 of the hopper, are brackets 45 and screw-seated therein are threaded rods 46, the lower ends of which are mounted for rotation in the plates or brackets 41.

The upper ends of these rods 46 are provided with heads or loops 47.

Thus by rotating the threaded rods 46, the same are raised or lowered and corresponding movement is imparted to valve 43 to move its notched lower edge toward or away from the periphery of the axle.

Thus it will be seen that I have provided a lawn seed and fertilizer distributor that is relatively simple of construction, inexpensive of manufacture and very effective in performing the functions for which it is intended.

The gate or valve that controls the discharge of seed and fertilizer from the hopper may be easily and quickly adjusted so as to accurately regulate and bring about an even discharge of the seed and fertilizer from the hopper and the construction of the controlling gate or valve is such as to prevent wasteful leakage of the seed and fertilizer when the machine is at rest.

It will be understood that minor changes in the size, form and construction of the various parts of my improved lawn seed and fertilizer distributor may be made and substituted for those herein shown and described without departing from the spirit of my invention, the scope of which is set forth in the appended claims.

I claim as my invention:

1. In a lawn seed and fertilizer distributor, a hopper having inclined bottom walls, there being a longitudinally disposed opening formed between the lower ends of said inclined walls, bearings depending from the lower portion of the hopper at the ends of said opening, an axle journalled in said bearings and disposed lengthwise below the opening in the bottom of the hopper, keepers secured to the bottom of the hopper to one side of the opening therein above said bearings, a gate mounted for sliding movement against the outside of the bottom of said hopper adjacent the opening therein, the ends of which gate are mounted for sliding movement in said keepers, the edge of which gate adjacent the axle journalled in said bearings being provided with spaced notches and means for moving said gate toward and away from said axle.

2. In a lawn seed and fertilizer distributor, a hopper having inclined bottom walls, there being a longitudinally disposed opening formed between the lower ends of said inclined walls, bearings depending from the lower portion of the hopper at the ends of said opening, an axle journalled in said bearings and disposed lengthwise below the opening in the bottom of the hopper, keepers secured to the bottom of the hopper to one side of the opening therein above said bearings, a gate mounted for sliding movement against the outside of the bottom of said hopper adjacent the opening therein, the ends of which gate are mounted for sliding movement in said keepers, the edge of which gate adjacent the axle journalled in said bearings being provided with spaced notches, means for moving said gate toward and away from said axle and a strap adjustably mounted on the inner face of the bottom of the hopper on the opposite side of the opening therein from said sliding gate, the lower edge of which strap projects beyond the edge of the bottom of the hopper on which it is mounted, to close the gap between the edge of said bottom and said axle.

GEORGE MARLSDALE.